United States Patent [19]

Tsuchiya et al.

[11] 4,048,132

[45] Sept. 13, 1977

[54] PRINTING INK COMPOSITION

[75] Inventors: Shozo Tsuchiya, Kawasaki; Hideo Hayashi; Akio Oshima, both of Yokohama, all of Japan

[73] Assignee: Nippon Oil Company Ltd., Tokyo, Japan

[21] Appl. No.: 710,659

[22] Filed: Aug. 2, 1976

[30] Foreign Application Priority Data

Aug. 5, 1975 Japan .................................. 50-94694

[51] Int. Cl.$^2$ ................... C08F 232/06; C08F 232/08; C08K 5/01
[52] U.S. Cl. ............................... 260/33.6 UA; 526/87; 526/283; 526/308
[58] Field of Search ............... 260/33.6 UA; 526/283, 526/308, 87

[56] References Cited

U.S. PATENT DOCUMENTS

| | | | |
|---|---|---|---|
| 2,454,743 | 11/1948 | Mowry et al. | 526/283 |
| 2,462,400 | 2/1949 | Hoover | 526/283 |
| 3,487,054 | 12/1969 | Minnerly et al. | 526/283 |
| 3,826,760 | 7/1974 | Takeshita et al. | 526/283 |

FOREIGN PATENT DOCUMENTS 2,354,602  5/1974  Germany

*Primary Examiner*—Donald E. Czaja
*Assistant Examiner*—H. H. Fletcher
*Attorney, Agent, or Firm*—Sherman & Shalloway

[57] ABSTRACT

Printing ink composition characterized by containing as a vehicle a resin having a softening point of 100° C. or more and acid value of 5 to 50, said resin being obtained by reacting the following three components A, B and C, i.e., cyclopentadiene, dicyclopentadiene or their alkyl substituted derivatives as the A component an $\alpha,\beta$-unsaturated monocarboxylic acid as the B component and alkyl esters of said monocarboxylic acid as the C component, in proportions of such amounts as to satisfy the following formulae, $$0.05 \leq \frac{[B] + [C]}{[A]} \leq 1.0$$

$$1/5 \leq \frac{[C]}{[B]} \leq 5$$

at a temperature in the range of 150° – 350° C. in the absence of a catalyst.

12 Claims, No Drawings

PRINTING INK COMPOSITION

This invention relates to a printing ink composition, More specifically, the present invention relates to a printing ink composition using as a vehicle a resin having a softening point of not lower than 100° C. and an acid value of 5 to 50 which is obtained by thermally polymerizing the following three A, B and C components, i.e., cyclopentadiene, dicyclopentadiene or their alkyl substituted derivatives as the A component, an α,β-unsaturated monocarboxylic acid as the B component and alkyl esters of said monocarboxylic acid as the C component.

Alkylphenolic resin, rosin-modified phenolic resin, rosin-modified alkyd resin, and maleic acid resin are typical of resins which have been highly regarded for their excellent properties as resins used in varnishes for printing inks. However, current printing processes require even a higher rate of printing speed, and different studies have been made to cope with the pressing demand for resins of high softening point which excel not only in drying property but also in printing effects, such as gloss, luster, etc. Nevertheless, these efforts have not yet successfully provided resins which equal or outstrip rosin type resins, such as rosin-modified phenolic resin and the like. In addition, because it is a naturally occurring substance, the use of rosin as a starting material has many drawbacks, such as an unstable supply, as well as high costs. Accordingly, the development of resins for printing ink instead of rosin type resins is required.

Petroleum resins obtained by polymerizing cracked oil fractions are available in large quantities as by-products in the petroleum or petrochemical industry; and these resins have the advantage of stability both in their supply and in their costs but are far from satisfactory in their qualities when used as resin for printing inks. It would therefore be desirable if petroleum resins could be utilized as a source for resins for printing ink. However, a resin derived from petroleum resin which has the requisite properties for use in printing inks, particularly offset printing ink has not yet been developed.

The basic properties required of printing ink and offset ink, in particular, are as follows:
1. Values indicative of flowability, such as viscosity and yield value, should be moderate.
2. Since a drawing line is formed on the plane with water and ink adjoined, an interfacial balance should be maintained between the water retaining part and thick parts.
3. Pigment dispersibility should be good.
4. Gloss on the printed surface should be in a good condition and printed matter should be uniform.
5. Setting time and drying time should be rapid so that blocking may not be caused.
6. Printed surface should be good in abrasion resistance and the like.

In order to meet the above capabilities required of an offset ink the properties of the resin used therefor should satisfy the following requirements:
1. It has a high softening point but is not of a high molecular weight.
2. It has a polar group having good affinity for pigments.
3. It has enough solubility in high boiling hydrocarbon solvents of a low aromatic content used for offset ink.
4. It has enough solubility in dry oils, such as linseed oil for example.

As a result of intensive studies in search for a resin which satisfies the requirements for the printing ink, especially for the offset ink, the inventors of this invention have discovered that the abovementioned objects can be attained with a resin having a softening point of 100° C. or more and an acid value of 5 to 50 which is obtained by reacting the following three A, B and C components, i.e., at least one member selected from the group consisting of cyclopentadiene, dicylcopentadiene and their alkyl substituted derivatives as the A component, a specific α,β-unsaturated monocarboxylic acid as the B component and an alkyl ester of said monocarboxylic acid as the C component, under specific reaction conditions. Based on this discovery the present invention is completed.

In accordance with the present invention, there is provided a printing ink composition containing a resin having a softening point of 100° C. or more and an acid value of 5 to 50 as a vehicle, said resin being obtained by reacting the three components A, B and C selected from the following groups, respectively, in such a proportion as to satisfy the formulae (1) and (2) below in the absence of a catalyst at a temperature in the range of 150° to 350° C;

$$0.05 \leq \frac{[B] + [C]}{[A]} \leq 1.0 \tag{1}$$

$$1/5 \leq \frac{[C]}{[B]} \leq 5 \tag{2}$$

wherein each of [A], [B] and [C] designates the molar amount of each component A, B and C;

A Component:
  at least one member selected from the group consisting of cyclopentadiene, dicyclopentadiene and their $C_1$–$C_6$-alkyl substituted derivatives;

B Component:
  at least one α,β-unsaturated monocarboxylic acid selected from the group consisting of acrylic acid and methacrylic acid; and C Component:
  at least one alkyl ester selected from the alkyl esters of the abovementioned α,β-unsaturated monocarboxylic acids as the B component (with the proviso that the alkyl group has 1 to 22 carbon atoms).

The resin obtained in the above manner is excellent in its solubility in drying oils and high boiling solvents that are used generally for printing inks. The printing ink using this resin as a vehicle does not cause misting to occur, has excellent printing properties and exhibits superior printing effects of printed matters such as gloss, luster and so forth. Especially the printing ink has good flowability as well as good stability.

The vehicle resin used for the printing ink composition of the present invention is obtained by reacting the following three components A, B and C.

A Component:
  As the A Component: is used at least one member selected from the group consisting of cyclopentadiene, dicyclopentadiene and their $C_1$–$C_6$ alkyl substituted derivatives. (Hereinafter these members are referred to simply as dicyclopentadiene as typical of the A component).

B Component:

The α,β-monocarboxylic acid as the B component includes acrylic acid and methacrylic acid. These acids may be used as the B component either alone or as a mixture.

C Component:

The esters of α,β-unsaturated monocarboxylic acid as the C component are alkyl esters of acrylic acid and methacrylic acid. The alkyl group has 1 to 22 carbon atoms, preferably 1 to 8 carbon atoms. At least one of th alkyl esters is used as the C component.

The vehicle resin to be used in the printing ink composition in the present invention is produced by thermal polymerization of these three components in a sealed vessel at a temperature in the range of 150° to 350° C., preferably in the range of 200° to 300° C. over a period of 30 minutes up to 15 hours.

The reaction may be carried out in the absence of a solvent to yield the resin as a product. In order to facilitate the removal of the reaction heat at the time of the thermo-polymerization reaction and also to obtain easier control over the molecular weight and softening point of the resulting resin, it is usually preferred to carry out the reaction using a solvent. For this purpose inert hydrocarbon solvents are used suitably such as benzene, toluene, xylene, isooctane, solvent naphtha and so on.

The abovementioned polymerization reaction may be performed in varying modes. For instance, the reaction may be initiated by charging the A, B and C component into a reaction vessel from the very beginning. Alternatively, the reaction may be effected to a certain extent by charging only the A component into the reactor and thereafter either both B anc C components are added simultaneously, or either one of the B or C component is first added with the rest being added subsequently to further continue the polymerization till it is completed. Still another method involves the steps of first charging the A component together with either the B component or C component into the reaction vessel to initiate the polymerization, adding the rest to the reactor on the way of the reaction and further continuing the reaction till it is completed.

After the dicyclopentadiene (A component), α,β-unsaturated monocarboxylic acid (B component) and alkyl ester of said monocarboxylic acid (C component) have been reacted at a prescribed temperature for a prescribed period of time in the abovementioned manner, the unreacted monomers, lower molecular weight polymers and solvent are separated either by distillation or by evaporation to thereby yield the resin as a product.

In the abovementioned thermal-polymerization reaction, it is possible to properly adjust the molecular weight and softening point of the resulting resin by selecting a proper combination of the monomer concentration, reaction temperature and reaction time.

It is not always necessary that the dicyclopentadiene to be used as the starting A component have a high purity. However, it is preferred that cyclopentadiene, dicyclopentadiene or their alkyl-substituted derivatives are present in an amount of at least 80% by weight in the starting A component. For example, those concentrated fractions may be used in the present invention which are obtained by first thermally-dimerizing cyclopentadiene and methylcyclopentadiene contained in $C_5$ fractions as the by-product of high temperature cracking of petroleum fractions, e.g. naphtha, to thereby form mixtures of dicyclopentadiene, dimethylcyclopentadiene, cyclopentadiene-methylcyclopentadiene co-dimer, cyclopentadiene-isoprene co-dimer, cyclopentadiene-piperylene co-dimer, etc., and then removing the greater part of the $C_5$ components such as $C_5$ olefins, $C_5$ paraffins and the like by distillation.

In practising the polymerization reaction in accordance with the present invention, each component must be used in such an amount as to satisfy the two conditions specified in the invention.

The first condition is that the total amount of the B and C components should be in the range of 0.05 to 1.0 mole per mole of the A component. If the total amount of the B and C components exceeds 1.0 mole per mole of the A component, the resulting resin is undesirably deteriorated in its solubility in high boiling hydrocarbon solvents essentially requred as a component in an offset ink varnish. If the total amount of the B and C components is lower than 0.05 mole per mole of the A component, on the other hand, the resin also decreases undesirably its solubility in drying oils such as linseed oil as a component for the varnish.

The second condition for the amounts of the components is that the molar artio of the C component to the B component should be in the range of from 1/5 to 5.0. If this molar ratio is larger than 5.0, the printing ink composition using the resulting resin does not sufficiently provide gloss on the printed surface. On the other hand, if the molar ratio is smaller than 1/5, the printing ink composition is not good in its flowability. Hence, no satisfactory result is obtained in either case.

In producing the resin of the present invention, it is also the essential requirement to select the suitable ratios of the A, B and C components so that the acid value of the resulting resin falls within the range of 5 to 50. When the acid value exceeds 50, the printing ink composition using the resin has an excessively large emulsifiability in fountain solution at the time of printing and becomes inferior in its printability. When the acid value is less than 5, the resin provides a poor pigment dispersability in forming the printing ink composition. It is therefore preferred that the acid value of the resulting resin is in the range of from 5 to 25.

The resin of the invention prepared in the above manner must have a softening point of 100° C. or more. If the softening point of the resin is lower than 100° C., the printing ink composition prepared from the resin causes mistings so frequently and has such a lowered drying speed that blockings are easily occurred.

As mentioned above, the resin to be used as a vehicle of the printing ink composition of the present invention is obtained by thermally-polymerizing the three essential components, i.e. dicyclopentadiene, α,β-unsaturated carboxylic acid and alkyl esters of said carboxylic acids under the reaction conditions as specified in the invention so that the resulting resin has a softening point of 100° C. or more and an acid value of 5 to 50.

Using the resin thus obtained as a vehicle, the printing ink composition of the present invention may be prepared in accordance with optional methods for producing inks that are known conventionally. For instance, the present printing ink composition is produced by dissolving 100 parts of the resin obtained in the above manner in 0 – 150 parts of oils such as a drying oil and 0 – 100 parts of hydrocarbon solvent, either at ordinary temperature or under heating, to thereby form a varnish having a viscosity of about 500 poises at room temperature, blending pigments and other components with the varnish and kneading the mixture with a roll and the like.

The present invention will be made more apparent with reference to the following Examples which are simply illustrative but in no way limitative of the scope of the invention.

EXAMPLE 1

528 g (4 moles) of dicyclopentadiene (DCPD) of a purity of 97%, 100 g (1 mole) of methyl methacrylate, 36 g (0.5 mole) of acrylic acid and 300 g of commercially available mixed xylene for industrial use where charged into a 2l autoclave equipped with a stirrer and reacted at 270° C. for 90 minutes. After completion of the reaction, the autoclave was cooled and the contents were distilled to remove unreacted monomers, low molecular weight polymers and xylene. There was obtained 570 g of a resin [I] having a softening point of 145° C. and an acid value of 6.

EXAMPLE 2

396 g (3 moles) of DCPD of a purity of 95%, 50 g (0.5 mole) of methyl methacrylate, 86 g (1 mole) of methacrylic acid and 230 g of toluene were charged into a 2l autoclave equipped with a stirrer and reacted at 250° C. for 3 hours. After completion of the reaction, the contents were treated in the same way as in Example 1 to thereby afford 300 g of a resin [II] having a softening point of 152° C, and an acid value of 14.

EXAMPLE 3

A $C_5$ cracked oil fraction (boiling at 28°–60° C.), a by-product during the production of ethylene, propylene, etc. by steam-cracking of naphtha was heated at 120° C. for 4 hours to remove the $C_5$ fraction by distillation. The residue contained 85% of DCPD with the balance containing cyclopentadiene-isoprene co-dimer, cyclopentadiene-piperylene co-dimer and so on.

528 g of this fraction containing 85% of DCPD, 92 g of 2-ethylhexyl acrylate and 43 g of methacrylic acid were charged into an autoclave and reacted at 270° C. for 6 hours. After completion of the reaction, the contents were treated in the same way as in Example 1 to thereby afford a resin [III] havin a softening point of 140° C. and an acid value of 8.

EXAMPLE 4

528 g (4 moles) of DCPD of a purity of 97%, 100 g (1 mole) of ethyl acrylate, 72 g (1 mole) of acrylic acid and 300 g of cyclohexane were charged into an autoclave and reacted at 260° C. for 150 minutes. After completion of the reaction, the contents were treated in the same way as in Example 1 to thereby afford a resin [IV] having a softening point of 136° C, and an acid value of 15.

Comparative Example 1

528 g (4 moles) of DCPD of a purity of 97%, 100 g (1 mole) of methyl methacrylate and 280 g of commercially available mixed xylene were charged into an autoclave and reacted at 270° C. for 150 minutes. After completion of the reaction, the contents were treated in the same way as in Example 1 to thereby afford a resin [C-I] having a softening point of 139° C. and an acid value of lower than 2.

Comparative Example 2

396 g (3 moles) of DCPD of a purity of 95%, 72 g (1 mole) of acrylic acid and 200 g of toluene were charged into an autoclave and reacted at 250° C. for 5 hours. After completion of the reaction, the contents were treated in the same way as in Example 1 to thereby afford a resin [C-II] having a softening point of 134° C. and an acid value of 38.

Comparative Example 3

132 g (1 mole) of DCPD of a purity of 97%, 100 g (1 mole) of methyl methacrylate, 72 g (1 mole) of acrylic acid and 200 g of commercially available mixed xylene were charged into an autoclave and reacted at 260° C. for 3 hours. After completion of the reaction, the contents were treated in the same way as in Example 1 to thereby afford a resin [C-III] having a softening point of 130° C. and an acid value of 70.

Using each of the resins obtained in the abovementioned Examples 1 through 4 and Comparative Examples 1 through 3, a varnish was prepared in accordance with the following recipe, from which ink was then prepared in order to test the ink characteristics.

(PREPARATION OF VARNISH)

70 g of linseed oil was added to 100 g of the product resin and heated at 230° C. for two hours. After that, 40 g of petroleum hydrocarbon solvent (specific gravity 0.852 aniline point 72.8, initial boiling point 272° C. end point 308° C.) was added and uniformly mixed to yield varnish.

(PREPARATION OF INK)

By using three roller mill, the following ingredients were kneaded at the composition rate as described bllow. However, the amount of the petroleum hydrocarbon solvent was suitably adjusted so that the tack value of ink become 10 ± 0.5.

| | |
|---|---|
| Carmine 6B* | 18 g |
| Varnish | 67 g |
| Solvent | 5–10 g |
| Abrasion resistant compound | 3 g |
| Dryer for ink | 2 g |

*Carmine 6B is the common name for the pigment having the formula:

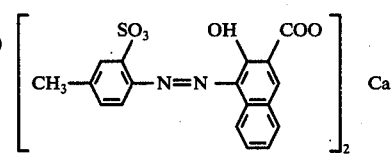

PERFORMANCE TEST AND RESULT

Gloss: 0.4 c.c. of ink was extended on art paper using an RI tester, and allowed to stand for 24 hours. Then, the gloss was measured by a 60°–60° glossmeter.

Setting time: After extending 0.4 c.c. of ink on art paper by means of the above-mentioned RI tester, another sheet of art paper was superimposed on the ink-extended surface of the art paper. Using an RI tester roller, the degree of adhesion of ink to the superimposed art paper was observed with the lapse of time, and the time elapsed until there was no adhesion of ink was measured.

Misting: 2.4 c.c. of ink was placed on Inkometer and rotated for 3 minutes at 1200 rpm. The degree of misting of ink to art paper placed under the roll was observed.

Drying time: 0.4 c.c. of ink was spread on art paper using the above-mentioned RI tester, and then the drying time was measured by an ink drying tester.

The test results are shown in the following table.

| Type of resin | Varnish viscosity (poises at 25° C.) | Gloss | Setting time (min.) | Drying time (hr.) | Misting |
|---|---|---|---|---|---|
| Example [I] | 450 | 68 | 10 | 5.5 | Not occured |
| Example [II] | 480 | 65 | 9 | 6.0 | " |
| Example [III] | 390 | 63 | 11 | 6.0 | " |
| Example [IV] | 400 | 61 | 11 | 6.0 | " |
| Comparative Example [C-I] | 390 | 50 | 13 | 6.5 | Slightly occured |
| Example [C-II] | 380 | 46 | 13 | 6.0 | " |
| Example [C-III] | 370 | Ink could not be obtained due to poor solubility. | | | |
| Control Resin* | 480 | 59 | 10 | 6.0 | Not occured |

*Control resin: Varnish was prepared by adding 100 g of linseed oil to 100 g of rosin-modified phenolic resin (Beckacite 1126, a product of Dainippon Ink and Chemicals Inc.) and heating the mixture for 30 minutes, followed by adding 40 g of the aforesaid petroleum hydrocarbon solvent.

It can be appreciated clearly from the above experimental results that the offset inks using the resins of Examples [I] -0 [IV] as a vehicle have satisfactory properties in every respect of the gloss, setting time, drying time and occurrence of misting whereas the offset inks using the resins of Comparative Examples are yet unsatisfactory in their ink properties.

Requirements are indeed extremely severe for the ink properties of offset inks in general. If any one of the abovementioned properties were not satisfactorily good, the ink could no longer serve for practical applications. The printing ink composition in accordance with the present invention has excellent properties which sufficiently satisfy these severe requirements. It is especially noteworthy that the present printing ink composition has better properties even in comparison with offset ink using a rosin-modified phenolic resin which has been believed to be the best vehicle resin.

We claim:

1. Printing ink composition characterized by containing as a vehicle a resin having a softening point of 100° C. or more and an acid value of 5 to 50, said resin being obtained by reacting the following three components A, B and C, i.e., A Component:
   at least one compound selected from the group consisting of cyclopentadiene, dicyclopentadiene and their $C_1$–$C_6$ alkyl-substituted derivatives;

B Component:
   at least one $\alpha,\beta$-unsaturated monocarboxylic acid selected from the group consisting of acrylic acid and methacrylic acid;

C Component:
   at least one alkyl ester of said $\alpha,\beta$-unsaturated monocarboxylic acid as the B component with the proviso that the number of carbon atoms of said alkyl group is from 1 to 22;

in proportions of such amounts as to satisfy the following formulae (1) and (2), $$0.05 \leq \frac{[B] + [C]}{[A]} \leq 1.0 \quad (1)$$

$$1/5 \leq \frac{[C]}{[B]} \leq 5 \quad (2)$$

at a temperature in the range of 150°–350° C. in the absence of a catalyst.

2. The printing ink composition as defined in claim 1 wherein said reaction is carried out in the absence of a solvent.

3. The printing ink composition as defined in claim 1 wherein said reaction is carried out in the presence of an inert hydrocarbon solvent.

4. The printing ink composition as defined in claim 3 wherein said solvent is a hydrocarbon solvent selected from the group consisting of benzene, toluene, xylene, iso-octane and solvent naphtha.

5. The printing ink composition as defined in claim 1 wherein the alkyl group of said C component has from 1 to 8 carbon atoms.

6. The printing ink composition as defined in claim 1 wherein the reaction temperature is in the range of 200° to 300° C.

7. The printing ink composition as defined in claim 1 wherein the reaction time is from 30 minutes to 15 hours.

8. The printing ink composition as defined in claim 1 wherein said resin has an acid value of 5 to 25.

9. The printing ink composition as defined in claim 1 wherein said A component, said B component and said C component all are made present in the reaction system and reacted from the beginning of the reaction.

10. The printing ink composition as defined in claim 1 wherein only said A component is polymerized at the beginning, and both of said B component and said C component are then added to the reaction system to continue the reaction till completion.

11. The printing ink composition as defined in claim 1 wherein only said A component is first polymerized, then either said B component or said C component is added to the reaction system to continue the reaction and thereafter either saID C component or said B component is added to the reaction system to continue the reaction till completion.

12. The printing ink composition as defined in claim 1 wherein either said B component or said C component is first reacted with aid A component, and then either said C component or aid B component is added to the reaction system to continue the reaction till completion.

* * * * *

UNITED STATES PATENT OFFICE
CERTIFICATE OF CORRECTION

Patent No. 4,048,132    Dated September 13, 1977

Inventor(s) Shozo Tsuchiya et al.

It is certified that error appears in the above-identified patent and that said Letters Patent are hereby corrected as shown below:

Claim 11, line 5, delete "saID" and insert -- said --.

Claim 12, line 3, delete "aid" and insert -- said --.

Claim 12, line 4, delete "aid" and insert -- said --.

Signed and Sealed this

Third Day of January 1978

[SEAL]

Attest:

RUTH C. MASON
Attesting Officer

LUTRELLE F. PARKER
Acting Commissioner of Patents and Trademarks